Aug. 4, 1959 W. S. MILLER 2,898,549
MEANS AND TECHNIQUES FOR DETERMINING QUALITY OF MILK
Filed Dec. 10, 1954
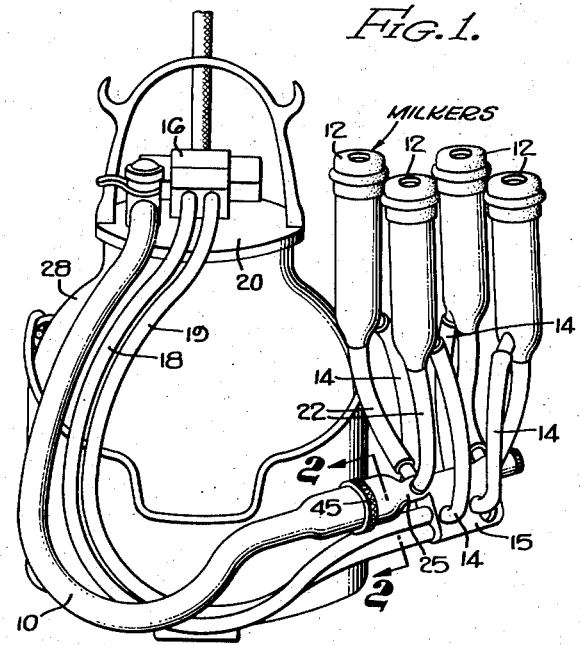
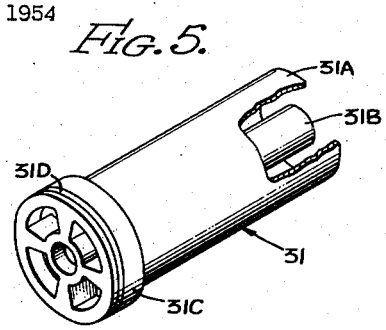
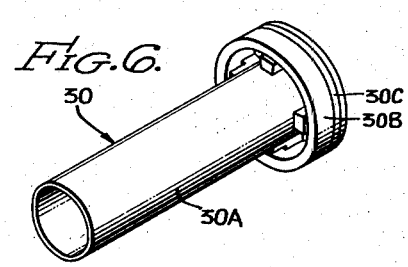
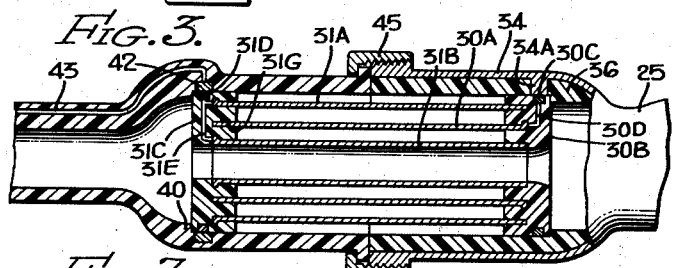
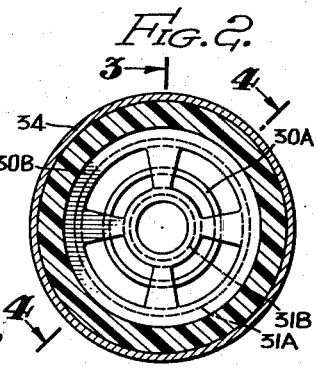
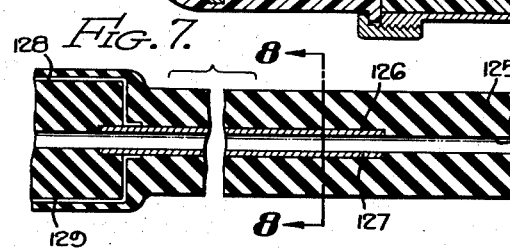
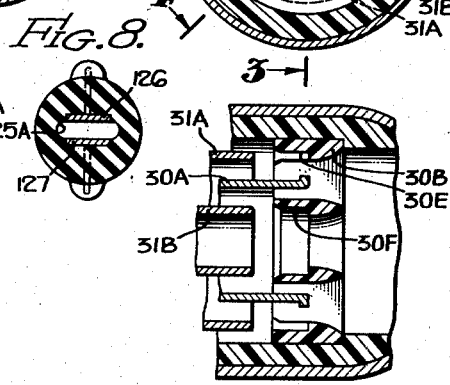
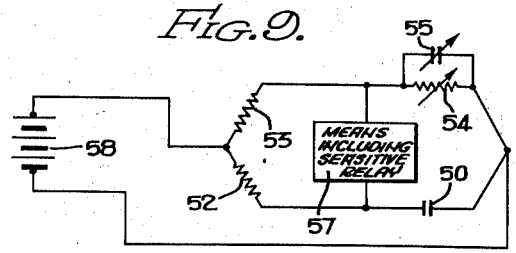
INVENTOR.
WENDELL S. MILLER
BY
Lyon & Lyon
ATTORNEYS

United States Patent Office 2,898,549
Patented Aug. 4, 1959

2,898,549

MEANS AND TECHNIQUES FOR DETERMINING QUALITY OF MILK

Wendell S. Miller, Los Angeles, Calif.

Application December 10, 1954, Serial No. 474,570

12 Claims. (Cl. 324—30)

The present invention relates to improved means and techniques for determining the quality of a liquid, and more particularly the quality of milk, and involves making measurements automatically and in a continuous manner when and as cows are being milked by conventional milking equipment.

It is highly desirable, from a nutrition and health standpoint, to determine the quality of milk, particularly its taste, acidity, and in general to determine whether or not such milk is being supplied from a cow having mastitis. The usual method involves periodically sampling the milk which is delivered from one or more cows with the attendant disadvantages resulting from such periodic sampling. Such sampling may be carried out using different techniques, and in this respect it has heretofore been proposed that the conductivity of the milk be measured to determine whether the milk was delivered from a cow having mastitis. Apart from the fact that sampling occurs at periodic intervals which may be irregular in time, difficulties may be encountered in making measurements since the milk has a relatively low conductivity. Furthermore, the sample used may not be representative of average conditions and certainly is not representative of instantaneous conditions, and further inaccurate results may be obtained due to lack of cleanliness of the sampling measuring cell or from the fact that the true results may be obscured by polarization or like effects in the measuring cell.

In accordance with the present invention, measurements of conductivity are made continuously and are suitably indicated, and, if desired, used to sound an alarm when the conductivity of the milk exceeds a predetermined value. In order to assure accurate results of conductivity, the measuring cell is placed in the milking line so that the electrodes are continuously washed by the milk being delivered; and, furthermore, since the milk moves with respect to the electrodes of the cell, the effects of polarization are minimized. Furthermore, the measuring cell used for these purposes may be conveniently inserted and removed from the milking line in a simple manner and reassembled as desired.

It is, therefore, a general object of the present invention to provide improved means and techniques for these above indicated purposes.

Another object of the present invention is to provide improved means and techniques useful in determining whether or not a cow has mastitis.

Another object of the present invention is to provide improved means and techniques of this character which are relatively simple and which allow a continuous monitoring of the quality of the milk being delivered by a cow.

Another object of the present invention is to provide apparatus of this character which may be readily incorporated in conventional milking machines.

Another object of the present invention is to provide apparatus of this character in which conductivity measurements are more meaningful in that they are made while there is a good coloidal suspension in the milk and while the milk is at a substantially constant temperature.

Another object of the present invention is to provide apparatus of this character which avoids the necessity of of handling the milk and which avoids the necessity of of providing extraneous temperature control vessels to assure measurements of a constant temperature.

The features of the present invention which are believed to be novel are set forth with particularity in the appended claims. This invention itself, both as to its organization and manner of of operation, together with further objects and advantages thereof, may be best understood by reference to the following description taken in connection with the accompanying drawings in which:

Figure 1 is a perspective view illustrating conventional milking equipment with, however, an electrode system or cell disposed in the milk conduit in accordance with features of the present invention.

Figure 2 is a sectional view taken on line 2—2 of Figure 1.

Figures 3 and 4 are sectional views taken substantially on lines 3—3 and 4—4 of Figure 2; but Figure 4 shows the two movable elements of the cell in a detached condition.

Figure 5 is a perspective view of one of the elements of the measuring cell with a portion thereof broken away.

Figure 6 is a perspective view of another element of the measuring cell which is intended to be telescoped within the measuring element illustrated in Figure 5 and disposed in the milk line as illustrated in Figure 1.

Figure 7 is a longitudinal sectional view through a modified cell also intended to be disposed in the milk line.

Figure 8 is a sectional view taken on the line 8—8 of Figure 7; and

Figure 9 illustrates a bridge circuit in which either the cell illustrated in Figure 3 or the cell illustrated in Figure 7 may be connected.

Referring to Figure 1, the milking equipment illustrated therein is considered conventional in all essential details; but in accordance with the present invention, an electrode structure or measuring cell is disposed within the milk line 10 so as to allow measurements to be made continuously of the electrical conductivity of the milk flowing through such line from either one of the four conventional milking cups 12. Such measurements are made using the bridge circuit illustrated in Figure 9.

These milking cups 12, in conventional manner, are connected to corresponding vacuum lines 14 which are all interconnected to a vacuum manifold 15, and this manifold 15 in turn is connected to an electrically driven vacuum pump 16 through the pair of vacuum lines 18 and 19. The pump 16 is illustrated as being mounted on the lid 20 of the milk receptacle or can 28. The milk gathered in each one of the cups 12 flows from such cup 12 through corresponding flexible hoses 22 to the common line 25 which extends to the milk can 28 and in which the electrode structure described in connection with Figures 2–6 is disposed. The assembly comprising the cups 12, vacuum lines 14, hoses 22 and the manifold 15 is commonly referred to as a spider. The conductivity measuring cell is located at the entrance to the milk line 10 and as close as practically possible to the manifold 15 which is a part of the spider, so that the temperature of the milk in the measuring cell is substantially the original temperature of the milk. The location of the cell is considered important since it has been observed that conductivity measurements for the purposes described herein are quite dependant upon temperature and indeed, false indications may be obtained by measurements made at temperatures which are even slightly lower than the original milk temperature. By locating the cell as close to the manifold 15 as possible near the entrance to the milk line 10, measurements are made at substantially the original milk temperature and thus the effect of critical temperature variations is eliminated.

The electrode structure or measuring cell is in the nature of two concentrically or telescopically disposed metallic elements 30 and 31, each constituting one plate of a measuring cell. The element 30 has a cylindrical portion 30A which has one end thereof embedded in an insulated apertured disc 30B of insulating material. An insulated apertured disc or brush 30C is embedded in the periphery of the insulated apertured disc 30B and is connected electrically by means of a connector 30D to the metallic cylinder 30A so as to allow this element 30A to be connected electrically with the outer metallic sheath or sleeve 34 of the milk line 25. This sheath or sleeve 34 is provided with an inwardly extending flange portion 34A which is arranged to frictionally engage the aforementioned insulated apertured disc 30B so as to provide a desired electrical contact when and as such element 30 is inserted in position within the milk line. In order to properly locate these two elements 34A and 30C in conducting relationship, the milk line 25 is provided with an internally disposed element 36 which provides a shoulder and a stop for the insulated apertured disc 30B when the element 30 is inserted in the milk line in its assembly. The other electrode element 31 is provided with two cylindrical portions 31A and 31B, these elements 31A and 31B being concentrically arranged with respect to the cylindrical portion 30A.

The cylindrical elements 31A and 31B are each embedded in a common insulated apertured disc of insulating material 31C in which is also embedded a contact ring 31D and conductor 31E. This insulating ring 31C is arranged to abut an inner shouldered portion 40 of the milk line 25 so as to properly locate the contact ring 31D with respect to the contact ring 42 which frictionally engages the aforementioned contact ring 41D and which is connected to the conductor 43, arranged so as to provide a convenient connection to the cell elements 31A and 31B. Once the electrode elements are thus arranged in telescope relationship, the hose 25 is coupled together by the internally threaded coupling ring 45 which engages the externally screw threaded portion of the outer sleeve or sheath 34.

It is noted that the insulated apertured disc 30B as illustrated in Figure 4 is provided with two spaced grooved portions 30E and 30F adapted to snugly receive the free ends of the corresponding electrode elements 31A and 31B; and, likewise, the apertured disc 31C is provided with an annular grooved portion 31G adapted to snugly receive the free end of the cylindrical electrode 30A.

It is apparent from this construction that the elements 30 and 31 of the cell may be conveniently assembled and disassembled from the milk line 25, using for that purpose the coupling nut 45 to join or separate, as the case may be, the two sections of the milk line 25.

In the modified structure illustrated in Figure 7, the milk line 125 which corresponds to milk line 25 in Figure 1 has a generally rectangular bore 125A in which is recessed a pair of spaced electrodes 126 and 127. The electrode 126 is connected to a connector 128; and the electrode 127 is connected to a connector 129. These electrodes 126 and 127 and connectors 128 and 129 may be molded within the milk line 125 so as to form a permanent part thereof.

The bridge circuit illustrated in Figure 9 has connected in one arm thereof a cell 50 which may be considered to be either the cell illustrated in Figure 3 or the cell illustrated in Figure 7. A resistor 52 is disposed in the second arm of the bridge; a resistor 53 is disposed in the third arm of the bridge; and an adjustable resistance 54, which is connected in parallel with an adjustable condenser 55, is connected in the fourth arm of the bridge. A sensitive element such as a sensitive meter or sensitive relay 57 is connected in the so-called galvanometer arm of the bridge, while the source of voltage 58 is connected in the so-called battery arm of the bridge. This source 58 may be either a source of direct current such as a battery, a source of alternating voltage; or such source 58 may comprise a source of continuous voltage and a source of alternating voltage connected in series.

In operation of the equipment once it is installed and operating produces a flow of milk through the milk line 25; and such milk flows, of course, between the spaced electrode elements. While such flow occurs, the conductivity of the same is being continuously determined or measured. The bridge circuit in Figure 9 is preferably adjusted so that milk of the desired quality does not cause appreciable unbalance of the bridge circuit; but if there should be increased conductivity of the milk resulting as, for example, from a cow having mastitis, the bridge is sufficiently unbalanced so as to cause operation of the sensitive relay 57 which in turn is connected to suitable indicating equipment for producing an alarm.

Instead of rendering an alarm, it is considered that the relay 57 may, if desired, be electrically connected to a solenoid valve in the milk line for shutting off the flow of milk in the event that the conductivity, as measured, exceeds a predetermined value.

Further, it is understood that the cell and measuring techniques described above may be used not only in conjunction with a single milking device, but the cell, if desired, may be disposed in a main milk line through which the milk is fed from a plurality of milking machines.

While the bridge circuit illustrated in Figure 9 incorporates a condenser 55, the same is considered surplusage when the source of voltage 58 is a continuous voltage. However, when the source 58 is an alternating voltage, the condenser 55 is used in effecting a balance of the bridge.

It is also understood that the bridge circuit illustrated in Figure 9 serves to develop a voltage in the so-called galvanometer arm which includes the sensitive relay 57 which is subject to a positive increase in voltage or a positive decrease in voltage, as the case may be, depending upon which direction the bridge is unbalanced. In other words, when there is no milk in the cell, the spacing between electrodes is, of course, filled with air; and the measured conductivity is, of course, very low.

This condition, while producing a relatively large voltage in the galvanometer arm, does not have the proper polarity for operating the sensitive relay 57. It is only when the conductivity of the fluid in the cell exceeds a predetermined threshold value that the relay 57 is operated. This adjustment allows successful operation even though there may be relatively large bridge unbalanced conditions in operation of the machine occasioned by air in the line prior to starting of the milking equipment, after stopping of the milking equipment, and in operation of the milking equipment, when in those instances there is air between pulses.

For purposes of reducing polarization effects and for avoiding chemical changes in the milk while in the cell, a relatively small voltage is applied between the cell terminals, such voltage being preferably less than one volt with a spacing between electrodes of approximately one millimeter. The electrode structure may be of stainless steel, although nickel is preferred. When the bridge is fed from an alternating source, both electrodes are preferably of nickel; and when the source 58 is a continuous voltage, the anode may be of nickel; and, if desired, the cathode may be of platinum.

The electrodes are preferably assembled so as to allow ease of cleaning, not only for sterilization purposes but also for purposes of cleaning them physically to free them of any sticky deposits or crud which may accumulate. One of the important features of the present invention is the conductivity measurements are made at a substantially constant temperature and without the use of extraneous temperature controlling means. Further, the conductivity measurements are made before the milk has had an opportunity to get appreciably cold and while there is a good colloidal suspension with no appreciable cream being separated out. Using these techniques, the results obtained are more meaningful and accurate of the conditions which are being investigated or controlled; and changes in conductivity over a relatively low range, for example ten percent, are indicative of the conditions being studied.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In an arrangement of the character described, an automatic milking device having a milk line, and a conductivity measuring cell at the beginning of said line such that the milk in said cell is substantially at its original temperature, and means for continuously measuring the conductivity of the milk when and as the same passes through said cell.

2. In an arrangement of the character described, an automatic milking device having a milk line, a conductivity measuring cell at the beginning of said line through which said milk flows such that the milk in said cell is substantially at its original temperature, and means connected to said cell for continuously measuring the conductivity of the milk passing through said cell.

3. In an arrangement of the character described, a milk line having two connectible parts, a first cylindrical electrode structure disposed in one of said parts, a second cylindrical electrode structure disposed in the other one of said parts, said first and second electrode structures telescoping one within the other when said two connectible parts are connected together to form a conductivity measuring cell, one of said parts having an inlet opening, the other one of said parts having an outlet opening, said inlet and outlet openings being each axially aligned with the axes of said first and second cylindrical electrode structures.

4. In an arrangement of the character set forth in claim 3, said first electrode structure being releasably secured in said one part, said second electrode structure being releasably secured in said other part, said one part having an electrical contact member frictionally engaged by said first electrode structure, and said other part having an electrical contact member frictionally engaged by said second electrode structure.

5. An arrangement as set forth in claim 3 in which said first electrode structure comprises two cylindrical electrodes disposed on opposite sides of said second electrode structure.

6. In an arrangement of the character described, a milk line having a milk channel, a pair of electrodes disposed on opposite sides of said channel, and at the beginning of said channel such that the milk between said electrodes is substantially at its original temperature, and electrical conductors extending through the wall of said line.

7. In a milking arrangement of the character described, a spider including a manifold, a milk line for collecting milk from said manifold, and a conductivity cell located at said manifold and at the beginning of said line such that the milk entering said conductivity cell continuously flows through the same at the original temperature of the milk and with good colloidal suspension.

8. In a milking arrangement of the character described, a spider including a manifold, a milk line connected to said manifold for conducting the milk away from said manifold, and a conductivity cell located in close proximity to said manifold with the milk passing through said cell before it enters said line such that the milk entering said conductivity cell continuously flows through the same at the original temperature of the milk and with good colloidal suspension.

9. In a milking arrangement of the character described, a spider including a manifold, a milk line for collecting milk from said manifold, a conductivity cell located at said manifold and at the beginning of said line measuring apparatus connected to said cell, said apparatus including means for indicating conductivity measurements and preventing an indication of said measurements when there is no milk in the cell.

10. In a milking arrangement of the character described, a spider including a manifold, a milk line for collecting milk from said manifold, a conductivity cell located at said manifold and at the beginning of said line, measuring apparatus connected to said cell, said apparatus comprising a bridge circuit in which said cell forms one arm of the bridge circuit, and means connected to said bridge circuit for indicating conductivity measurements which are above a predetermined value and preventing the indication of measurements when there is no milk in the cell.

11. In an arrangement of the character described, an automatic milking device having a milk line, a conductivity measuring cell in said line in such position in the line that the milk in said cell is substantially at its original temperature and with good colloidal suspension and means for continuously measuring the conductivity of the milk when and as the same passes through said cell.

12. In an arrangement of the character described for determining the quality of milk while the same is being continuously delivered from a mammal, the steps comprising means continuously measuring the conductivity of said milk at its original temperature while being continuously delivered and means associated with the last mentioned means for rendering an indication when the conductivity so measured exceeds a predetermined normal value, the first mentioned means being so located with respect to the mammal that the conductivity of the milk is measured at its original temperature and while in good colloidal suspension.

References Cited in the file of this patent

UNITED STATES PATENTS

| | | |
|---|---|---|
| 1,939,067 | Legg | Dec. 12, 1933 |
| 2,439,354 | Wolcott | Apr. 6, 1948 |
| 2,549,231 | Perkins | Apr. 17, 1951 |
| 2,599,583 | Robinson et al. | June 10, 1952 |
| 2,654,862 | Petersen | Oct. 6, 1953 |

FOREIGN PATENTS

| | | |
|---|---|---|
| 610,545 | Great Britain | Oct. 18, 1948 |
| 650,199 | Great Britain | Feb. 14, 1951 |